US011897405B2

(12) United States Patent
Umezawa et al.

(10) Patent No.: US 11,897,405 B2
(45) Date of Patent: Feb. 13, 2024

(54) COLLISION PREDICTION DETERMINATION DEVICE AND VULNERABLE ROAD USER PROTECTION SYSTEM

(71) Applicant: HONDA MOTOR CO., LTD., Tokyo (JP)

(72) Inventors: Masaki Umezawa, Wako (JP); Kenyu Okamura, Wako (JP); Hidetoshi Nakamura, Wako (JP); Hyejin Bae, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 387 days.

(21) Appl. No.: 16/884,700

(22) Filed: May 27, 2020

(65) Prior Publication Data

US 2020/0377048 A1 Dec. 3, 2020

(30) Foreign Application Priority Data

May 31, 2019 (JP) ................................ 2019-103289

(51) Int. Cl.
*B60R 21/34* (2011.01)
*B60R 21/013* (2006.01)
(Continued)

(52) U.S. Cl.
CPC ............ *B60R 21/013* (2013.01); *B60R 21/34* (2013.01); *B60R 21/36* (2013.01); *B60R 21/38* (2013.01)

(58) Field of Classification Search
CPC .............. B60R 21/013; B60R 21/0134; B60R 21/0136; B60R 21/34
See application file for complete search history.

(56) References Cited

U.S. PATENT DOCUMENTS 8,798,867 B2 * 8/2014 Stoll ................... B60R 21/0136
180/274
2003/0051936 A1 * 3/2003 Ishizaki .................. B60R 21/38
180/274
(Continued)

FOREIGN PATENT DOCUMENTS

JP 2008-521695 A 6/2008
JP 2015-143068 A 8/2015
(Continued)

OTHER PUBLICATIONS

Office Action received in corresponding Japanese application No. 2019-103289 dated Mar. 22, 2022 with English translation (10 pages).

*Primary Examiner* — Barry Gooden, Jr.
(74) *Attorney, Agent, or Firm* — Rankin, Hill & Clark LLP

(57) ABSTRACT

A collision prediction determination device of a subject vehicle includes: a surrounding area sensor (a camera/radar/lidar) configured to acquire surrounding area information which is information on an object present in a first monitor area including an area ahead of the subject vehicle in a traveling direction thereof; a proximity sensor (a sonar/pressure tube sensor) configured to acquire proximity information on proximity of the subject vehicle including information on a contact thereof with an object present in a second monitor area which is an area in a proximity of the subject vehicle; an interspace sensor (a sonar) configured to acquire interspace information which is information on an interspace between an in-vehicle component (a bulkhead/bumper beam) and a bumper member (a front bumper) disposed on the subject vehicle; and a collision prediction determination part configured to predict and determine a state of a collision of the subject vehicle with a vulnerable road user, including whether or not the collision has
(Continued)

occurred, based on the surrounding area information, the interspace information, and the proximity information.

6 Claims, 9 Drawing Sheets

(51) Int. Cl.
  *B60R 21/38* (2011.01)
  *B60R 21/36* (2011.01)

(56) References Cited

U.S. PATENT DOCUMENTS

| | | | |
|---|---|---|---|
| 2006/0100763 A1* | 5/2006 | Tanabe | B60R 21/0136 340/436 |
| 2009/0171536 A1 | 7/2009 | Zimmer | |
| 2015/0175120 A1 | 6/2015 | Gaas et al. | |
| 2015/0224956 A1* | 8/2015 | Takenaka | B60R 21/36 73/862.381 |
| 2016/0200275 A1* | 7/2016 | Le Merrer | B60R 21/36 180/274 |
| 2016/0375899 A1* | 12/2016 | Takenaka | B60W 10/18 701/41 |
| 2018/0114442 A1* | 4/2018 | Minemura | B60Q 9/008 |
| 2018/0304849 A1 | 10/2018 | Hashimoto et al. | |
| 2020/0377053 A1* | 12/2020 | Umezawa | G06V 20/58 |

FOREIGN PATENT DOCUMENTS

| | | |
|---|---|---|
| JP | 2015-521969 A | 8/2015 |
| JP | 2017-001466 A | 1/2017 |
| JP | 2018-063606 A | 4/2018 |
| WO | 2017065045 A1 | 4/2017 |

* cited by examiner

FIG. 3
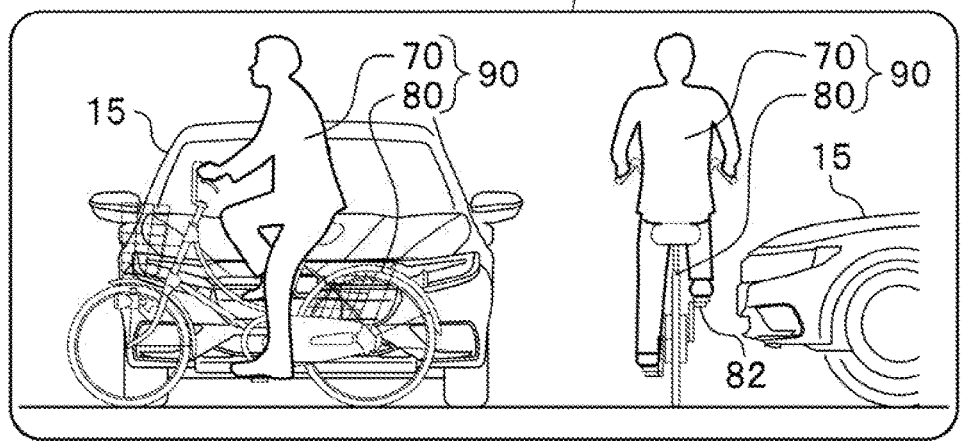
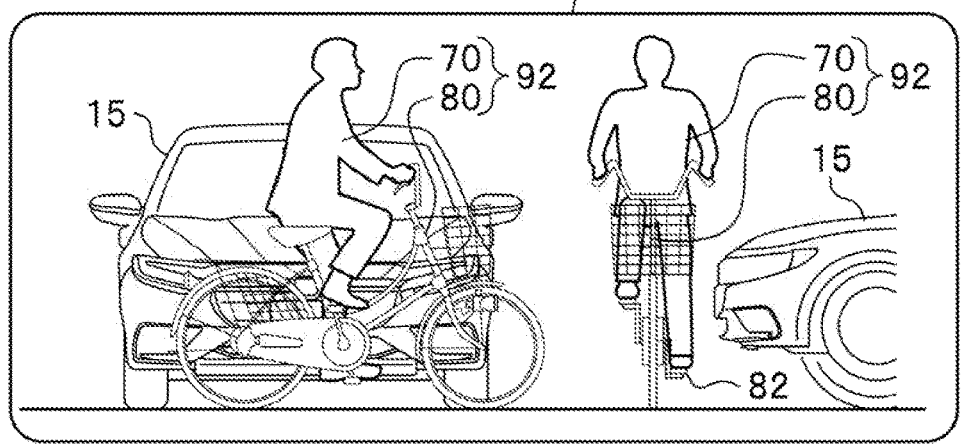
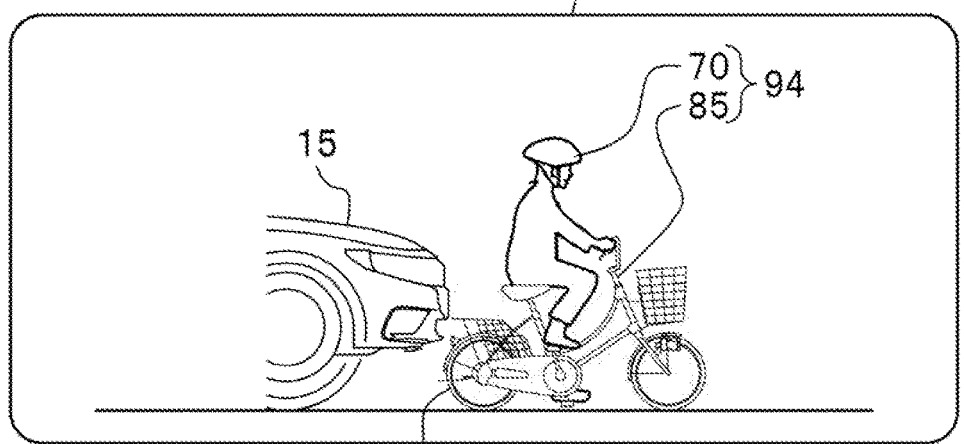

COLLISION PREDICTION DETERMINATION DEVICE AND VULNERABLE ROAD USER PROTECTION SYSTEM

CROSS REFERENCE TO RELATED APPLICATIONS

This application claims the benefit of Japanese Patent Application No. 2019-103289 filed on May 31, 2019, the disclosure of which is incorporated herein by reference.

BACKGROUND OF THE INVENTION

1. Field of the Invention

The present invention relates to a collision prediction determination device and a vulnerable road user protection system, in each of which a state of a collision of a subject vehicle with a vulnerable road user including a pedestrian and a cyclist can be predicted and determined suitably.

2. Description of the Related Art

Japanese Laid-Open Patent Application, Publication No. 2015-143068 (to be referred to as Patent Document 1 hereinafter) discloses a serious accident detection device that includes: a first collision detection sensor which detects a collision of a vehicle; a first collision determination part which determines whether a collision between the vehicle and a vulnerable road user occurred or not; a second collision detection sensor which detects a collision at a predetermined collision dangerous portion of a front portion of the vehicle; a second collision determination part which detects a secondary collision at the predetermined collision dangerous portion; a second collision determination part; and an accident determination part which determines whether a serious accident occurred or not, based on results determined by the first collision determination part and the second collision determination part.

Patent Document 1 also discloses that: the second collision detection sensor of the serious accident detection device includes a microphone; the second collision determination part determines whether the second collision between the vulnerable road user and the collision dangerous portion occurred or not based on a collision sound detected by the microphone; and, when the second collision determination part determines that the collision occurred within a predetermined time after the first collision determination part determines that the collision occurred, the accident determination part determines that a serious accident occurred.

The serious accident detection device according to Patent Document 1 can timely detect occurrence of a serious accident between a vehicle and a vulnerable road user.

Patent Document 1: Japanese Laid-Open Patent Application, Publication No. 2015-143068

SUMMARY OF THE INVENTION

Studies by the inventors of the present invention have found that, comparing a collision of a vehicle with an object relatively light in weight such as a pedestrian and a cyclist (which may also be collectively referred to as a vulnerable road user) with a collision of a vehicle with an object heavy in weight such as another vehicle and a guardrail, those collisions have respective tendencies different from each other of a collision state with the object (such as a collision situation of the object, a portion of the vehicle subjected to the collision, a magnitude of force of the collision, and a degree of deformation of a body of the vehicle). Regarding the collision with the vulnerable road user, it has also been found that a collision with a pedestrian and that with a cyclist have respective tendencies different from each other of a collision state of the vehicle with the vulnerable road user.

The present invention has been made based on the above-described novel findings and in an attempt to provide a collision prediction determination device of a subject vehicle which can more suitably predict and determine a collision state of the subject vehicle with a vulnerable road user including a pedestrian and a cyclist in detail.

The present invention has been made also in an attempt to provide a vulnerable road user protection system that includes the above-described collision prediction determination device and that can obtain excellent effects in protecting a vulnerable road user.

A collision prediction determination device of a subject vehicle includes: a surrounding area sensor configured to acquire surrounding area information which is information on an object present in a first monitor area including an area ahead of the subject vehicle in a traveling direction thereof; a proximity sensor configured to acquire proximity information which is information on proximity of the subject vehicle including a contact thereof with an object present in a second monitor area which is an area in proximity of the subject vehicle; an interspace sensor configured to acquire interspace information which is information on an interspace between a bumper member disposed on the subject vehicle and an in-vehicle component thereof; and a collision prediction determination part configured to predict and determine a state of a collision of the subject vehicle with a vulnerable road user including whether or not the collision has occurred, based on the surrounding area information acquired by the surrounding area sensor, the proximity information acquired by the proximity sensor, and the interspace information acquired by the interspace sensor.

The present invention has such advantageous effects that a collision state of a subject vehicle with a vulnerable road user including a pedestrian and a cyclist can be more suitably predicted and determined in detail.

BRIEF DESCRIPTION OF THE DRAWINGS

FIG. 3 is a diagram exemplifying a plurality of collision states predicted and determined by a collision prediction determination part according to the embodiment.

DETAILED DESCRIPTION OF THE EMBODIMENTS

Figure 1:
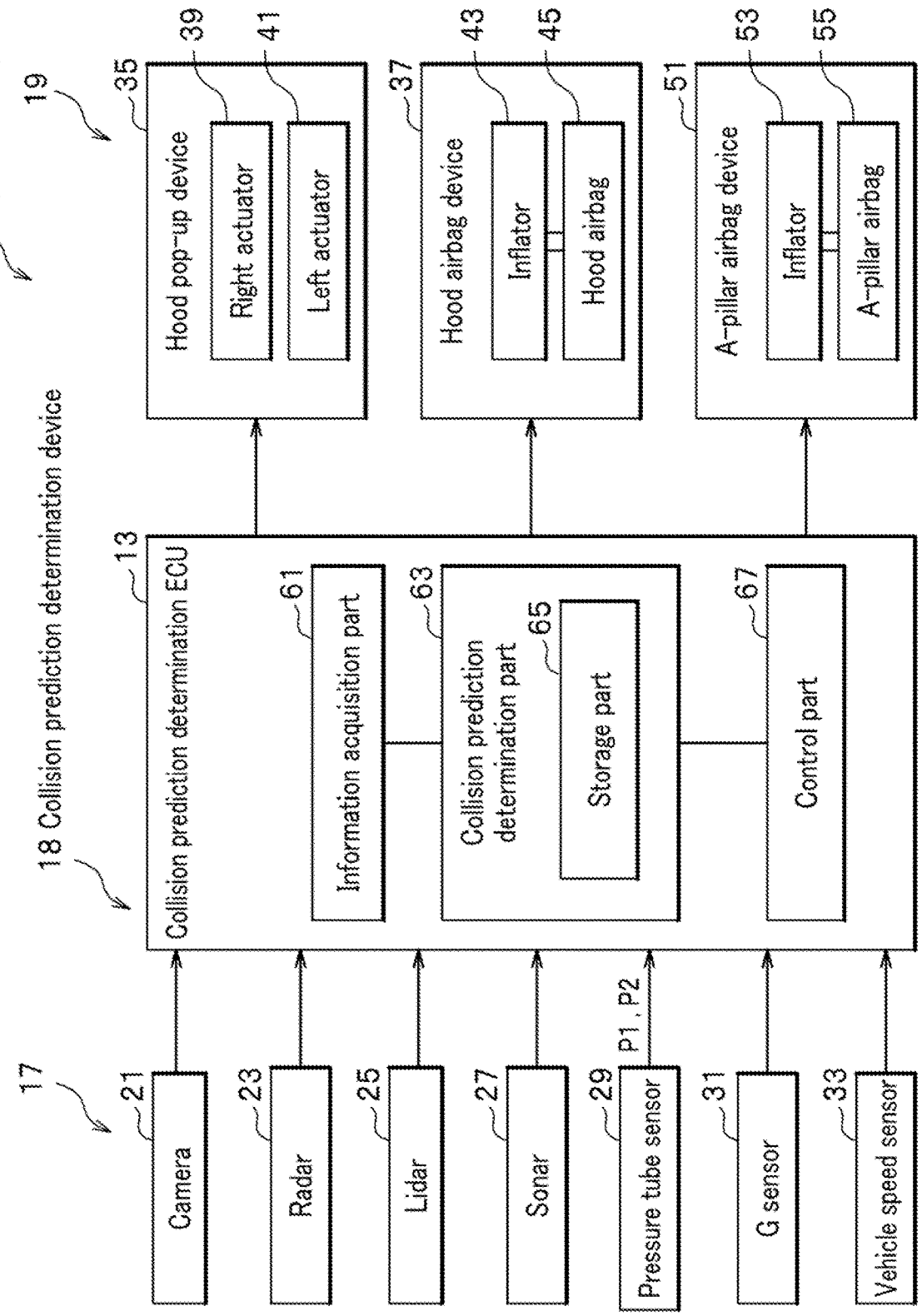
FIG. 1 is a block diagram illustrating an outline of a vulnerable road user protection system according to an embodiment of the present invention.

A collision prediction determination device and a vulnerable road user protection system according to an embodiment of the present invention are described below in detail with reference to related drawings.

In the related drawings illustrated hereinafter, the same reference numeral is basically assigned to a member or members having functions same or corresponding to each other. For convenience of explanation, a size or a shape of a member may be schematically illustrated by deformation or exaggeration.

<Outline of Vulnerable Road User Protection System 11 According to Embodiment of Present Invention>

An outline of a vulnerable road user protection system 11 according to an embodiment of the present invention is described below with reference to FIG. 1, FIG. 2A, and FIG. 2B where appropriate.

FIG. 1 is a block diagram illustrating the outline of the vulnerable road user protection system 11 according to the embodiment of the present invention. FIG. 2A is a front view illustrating a vehicle 15 equipped with a collision prediction determination device 18 according to the embodiment. FIG. 2B is an explanatory diagram schematically illustrating a front structure of a front bumper and a surrounding portion thereof of the vehicle 15 according to the embodiment.

The vulnerable road user protection system 11 is an apparatus for protecting an object (not illustrated) having collided with the vehicle (which may also be referred to as the subject vehicle) 15. The object assumed in the present invention is a vulnerable road user including, for example, a pedestrian and a cyclist. The cyclist herein collectively means both a person on a bicycle and the bicycle.

In this specification, let "front" be a direction in which the vehicle 15 travels forward; "rear", a direction in which the vehicle 15 travels backward; "up", a direction vertically upward of the vehicle 15; and "down", a direction vertically downward thereof. Also, let "right" and "left" be right and left directions viewed from a driver (not illustrated) facing forward, respectively.

The vulnerable road user protection system 11 includes a collision prediction determination ECU 13, an input system 17, and an output system 19.

The collision prediction determination ECU 13 basically predicts and determines a collision mode of the subject vehicle 15 collided with a vulnerable road user, including whether or not the collision has occurred.

In order to perform the above-described prediction and determination, the vehicle 15 includes: the input system 17 configured to allow an input of various types of information which is referenced when a collision of the subject vehicle 15 with a vulnerable road user is predicted and determined; and the output system 19 configured to protect the vulnerable road user from an impact of the collision, when the collision of the subject vehicle 15 with the vulnerable road user is predicted and determined.

In the present invention, a combination of the collision prediction determination ECU 13 and the input system 17 constitutes the collision prediction determination device 18.

Figure 2A:
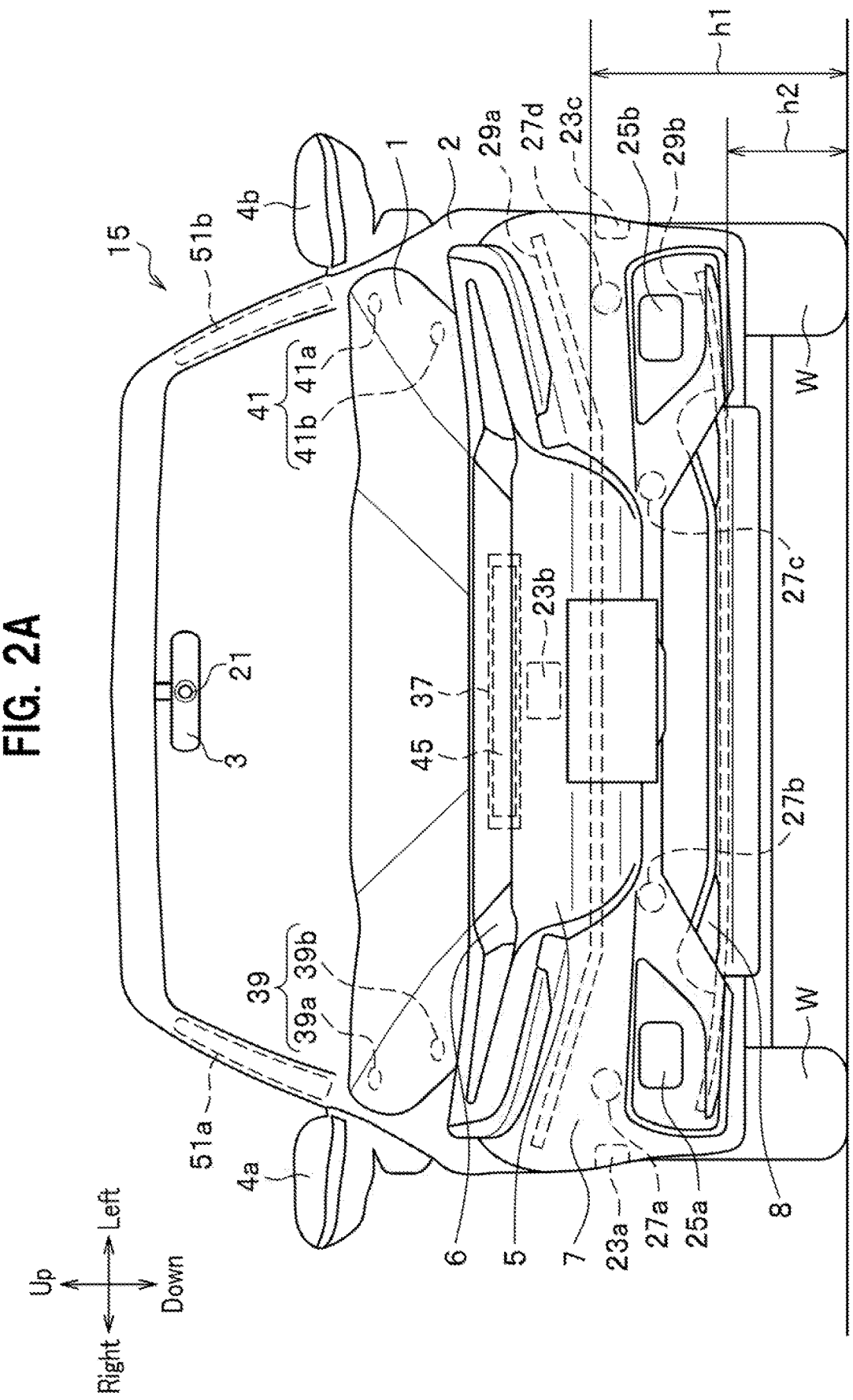
FIG. 2A is a front view illustrating a vehicle equipped with a collision prediction determination device according to the embodiment.
Figure 2B:
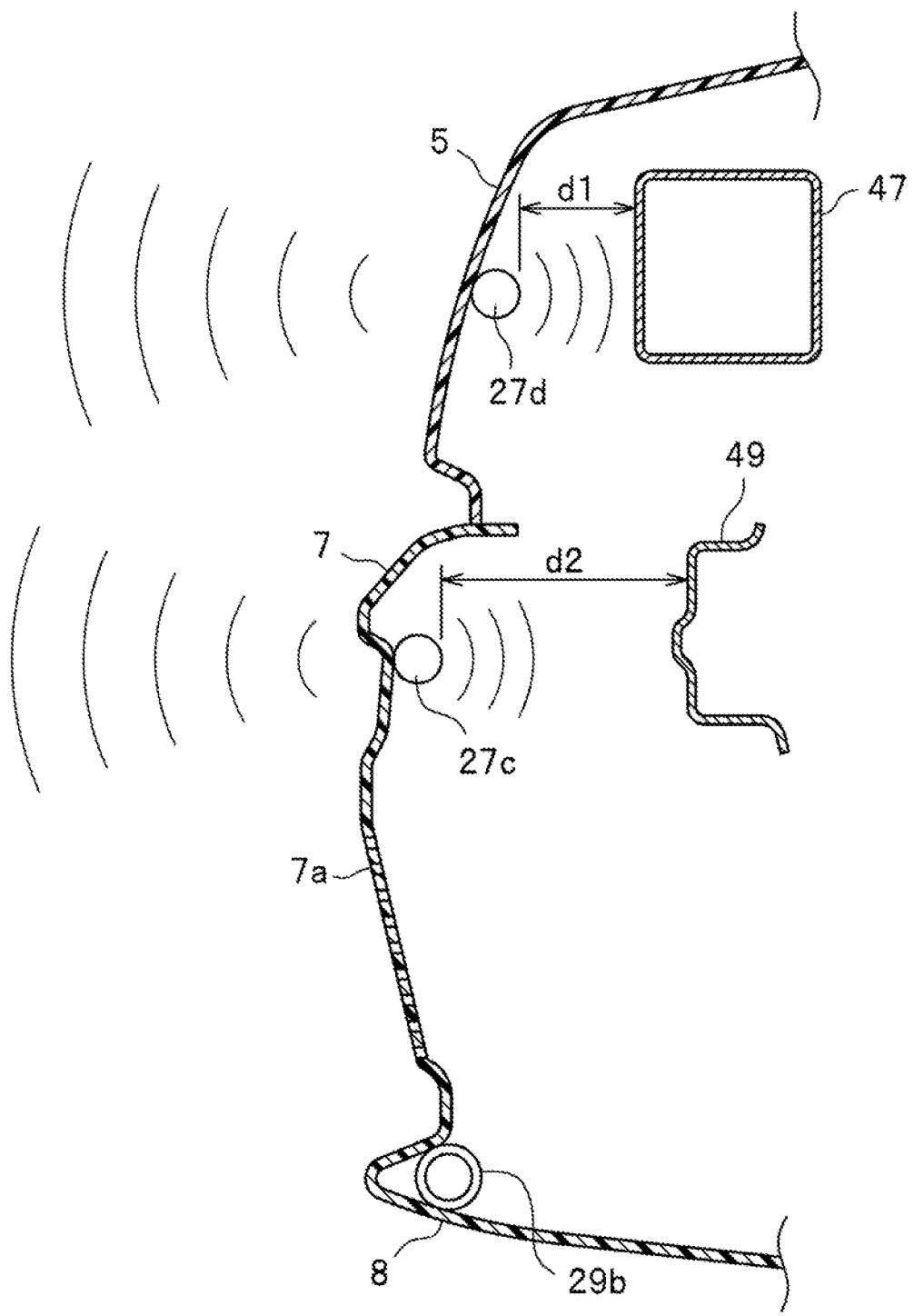
FIG. 2B is an explanatory diagram schematically illustrating a front structure of a front bumper and a surrounding part thereof of the vehicle according to the embodiment.

Next is described a structure of the vehicle 15 equipped with the collision prediction determination device 18 with reference to FIG. 2A and FIG. 2B.

The vehicle 15 when viewed from the front includes, as illustrated in FIG. 2A, a bonnet hood 1, a pair of front fenders 2, a rearview mirror 3, a pair of door mirrors 4a, 4b, a front grille 5, a hood edge cover 6, a front bumper 7, and a chin spoiler 8. A space below the bonnet hood 1 (reference numeral not designated) is typically used as an engine room.

A pair of the front fenders 2 are disposed right and left in a vehicle width direction of the bonnet hood 1; and are each an outer panel which covers front wheels W from above. The rearview mirror 3 is disposed at an upper front end in an interior of the vehicle 15; and is an indoor mirror used for securing a rearward view. The door mirrors 4a, 4b are disposed at right and left upper front ends of a pair of front doors (not illustrated), respectively; and are each an outer mirror used for securing a rearward view.

The front grille 5 is, as illustrated in FIG. 2A and FIG. 2B: a member disposed at a front end of the subject vehicle 15; takes in external air; and guides the taken external air to a radiator (not illustrated). The front grille 5 includes, for example, a plurality of substantially plate-shaped air guide plates (not illustrated) extending in the vehicle width direction arranged in parallel to one another at prescribed intervals in an up and down direction. The front grille 5 may also be referred to as a part of a "bumper member".

The hood edge cover 6 is disposed such that no space is made between the bonnet hood 1 and the front grille 5. The hood edge cover 6 includes a steel plate (reference numeral not designated) extending in the vehicle width direction along an end of the bonnet hood 1. The hood edge cover 6 is rotatably supported about an axis in right and left directions. A hood airbag device 37, which is to be described later, including a hood airbag 45 is disposed under the hood edge cover 6.

When the hood airbag 45 inflates and expands, the hood edge cover 6 is pushed up by the hood airbag 45 and rotates, to thereby pop up the hood airbag 45.

The front bumper 7 is, as illustrated in FIG. 2A and FIG. 2B, provided at the front end of the subject vehicle 15 and is a plate-like member for buffering impact. The front bumper 7 is plastically deformed when the vehicle 15 collides with an object, which allows the subject vehicle 15 to be protected from impact of the collision. The chin spoiler 8 is a plate-like member disposed below the front bumper 7. The chin spoiler 8 improves aerodynamic characteristics of the subject vehicle 15.

Referring back to the input system 17, the input system 17 includes a camera 21, a radar 23, a lidar 25, a sonar 27, a pressure tube sensor 29, a G sensor 31, and a vehicle speed sensor 33.

The camera 21 has an optical axis inclined forward and obliquely downward with respect to the subject vehicle 15 and takes an image in a traveling direction thereof. The camera 21 suitably used herein includes, for example, a CMOS (Complementary Metal Oxide Semiconductor) camera, and a CCD (Charge Coupled Device) camera. The camera 21 is disposed, for example, as illustrated in FIG. 2A, on a backside of the rearview mirror 3 in an upper center of a windshield of the subject vehicle 15.

Information on the image in the traveling distance of the subject vehicle 15 taken by the camera 21 is transmitted to the collision prediction determination ECU 13, as image information generated by means of, for example, interlace technology such as the NTSC (National Television Standards Committee).

The radar 23: emits radio waves such as milliwaves and microwaves forward and on lateral sides of the subject vehicle 15 in the traveling direction thereof; and detects radiowaves (reflected waves) reflected by an object. The radar 23 thereby acquires information on a distance from the vehicle 15 to the object and a direction thereof.

In the example illustrated in FIG. 2A, the subject vehicle 15 is equipped with three units of the radars 23, namely: a front right radar 23a and a front left radar 23c disposed in the respective front fenders 2; and a front center radar 23b disposed in the front grille 5. Information on distribution of an object present forward or on the lateral sides of the subject vehicle 15 in the traveling direction thereof acquired by the radar 23 is transmitted to the collision prediction determination ECU 13.

The lidar (Light Detection and Ranging) 25: emits a laser beam forward in the traveling direction of the subject vehicle 15; and detects a light scattered by reflection of the emitted laser beam. The lidar 25 thereby acquires information on a distance from the vehicle 15 to the object and a direction thereof.

In the example illustrated in FIG. 2A, the subject vehicle 15 is equipped with two units of the lidars 25, namely, a front right lidar 25a and a front left lidar 25b, both of which are disposed in the front bumper 7. Information on distribution of an object present in the traveling direction of the subject vehicle 15 acquired by the lidar 25 is transmitted to the collision prediction determination ECU 13.

Each of the camera 21, the radar 23, and the lidar 25 may also be referred to as an surrounding area sensor which acquires surrounding area information which is information on an object present in a first monitor area including an area ahead of the subject vehicle 15 in the traveling direction thereof.

The sonar 27: emits sound waves forward in the traveling direction of the subject vehicle 15; and receives reflected waves of the emitted sound waves. The sonar 27 thereby acquires information on whether or not any object is present ahead of the subject vehicle 15 in the traveling direction thereof and, if any, information on a relative speed between the object and the subject vehicle 15.

The sonar 27: emits sound waves backward in the traveling direction of the subject vehicle 15 (to an engine room); and receives reflected waves of the emitted sound waves. The sonar 27 thereby acquires information (distances d1, d2; see FIG. 2B) on respective interspaces between the front bumper 7, and the bulkhead 47 and the bumper beam 49 (in-vehicle components).

In the example illustrated in FIG. 2A, the subject vehicle 15 is equipped with four units of the sonars 27 on a side nearer to a backside of the front bumper 7, namely, a pair of front right sonars 27a, 27b and a pair of front left sonars 27c, 27d. Information on distribution of an object present in the traveling direction of the subject vehicle 15 acquired by the sonar 27 and the interspace information described above (the distances d1, d2; see FIG. 2B) is transmitted to the collision prediction determination ECU 13.

Note that the sonar 27 is designed to have a response speed higher than those of the radar 23 and the lidar 25, so as to respond to a bolt of an object onto a road, or the like.

The sonar 27 may also be referred to as: a proximity sensor configured to acquire proximity information which is information on proximity of the subject vehicle 15 including a contact thereof with an object present in a second monitor area which is an area in proximity of the subject vehicle 15; and an interspace sensor which acquires interspace information which is information on an interspace between a bumper member disposed on the subject vehicle 15 and an in-vehicle component thereof.

The pressure tube sensor 29: includes a cylindrical tube having flexibility; detects plastic deformation of the front bumper 7 by monitoring a crush of the cylindrical tube; and thereby acquires information on whether or not the subject vehicle 15 has collided with a vulnerable road user.

In the example illustrated in FIG. 2A, two units of the pressure tube sensors 29 are disposed on a backside of the front bumper 7 and the like, namely, first and second pressure tube sensors 29a, 29b each extending in the vehicle width direction of the subject vehicle 15.

More specifically, the first pressure tube sensor 29a extends, as illustrated in FIG. 2A, on the backsides of the front grille 5 and the front bumper 7 in the vehicle width direction. The first pressure tube sensor 29a has a mounting height h1 from a road surface of, for example, about 400 mm to about 600 mm.

The second pressure tube sensor 29b extends, as illustrated in FIG. 2A, under the first pressure tube sensor 29a, on the backsides of the front bumper 7 and the chin spoiler 8 in the vehicle width direction. The second pressure tube sensor 29b has a mounting height h2 from the road surface of, for example, about 200 mm to about 300 mm.

If and when the subject vehicle 15 has collided with an object; and the front grille 5, the front bumper 7, and the chin spoiler 8 are thereby plastically deformed, then a cylindrical cross section of the first and/or the second pressure tube sensors 29a, 29b corresponding to a part subjected to the deformation becomes crushed. This causes the first and/or the second pressure tube sensors 29a, 29b to output a collision detection signal in accordance with a pressure applied thereto. The collision detection signal outputted from the first and/or the second pressure tube sensors 29a, 29b is transmitted to the collision prediction determination ECU 13.

The pressure tube sensor 29 may also be referred to as another proximity sensor configured to acquire proximity information which is information on proximity of the subject vehicle 15 including a contact thereof with an object present in a second monitor area which is an area in proximity of the subject vehicle 15.

The G sensor 31 detects: a back-and-forth G (a back-and-forth acceleration/deceleration) generated in the subject vehicle 15 and a lateral G (a lateral acceleration/deceleration). G information detected by the G sensor 31 is transmitted to the collision prediction determination ECU 13.

The vehicle speed sensor 33 detects a vehicle speed of the subject vehicle 15. Information on the the vehicle speed detected by the vehicle speed sensor 33 is transmitted to the collision prediction determination ECU 13.

Referring back to the output system 19, the output system 19 includes a hood popup device 35, the hood airbag device 37, and an A-pillar airbag device 51.

When a collision of the subject vehicle 15 with a vulnerable road user is predicted and determined, the hood popup device 35 lifts up the bonnet hood 1 at a prescribed timing. This reduces an impact on a head of the vulnerable road user collided with the subject vehicle 15.

The hood popup device 35 includes a pair of right actuators 39a, 39b and a pair of left actuators 41a, 41b disposed in each of four corners of the bonnet hood 1, so as to extendably support the substantially square-shaped bonnet hood 1 from below.

Each of a pair of the right actuators 39a, 39b and a pair of the left actuators 41a, 41b is driven independently in a freely advancing and retracting manner.

When a collision of the subject vehicle 15 with a vulnerable road user is predicted and determined, the hood airbag device 37 inflates and expands the hood airbag 45 at a timing when the head of the vulnerable road user comes close to the bonnet hood 1. This reduces an impact on the head of the vulnerable road user collided with the subject vehicle 15.

The hood airbag device 37 includes an inflator 43 and the hood airbag 45. The inflator 43 includes, for example: an ignitor not illustrated which is ignited upon receiving a signal instructing expansion of the hood airbag 45; a gas generating agent such as sodium azide; and a housing for accommodating the ignitor and the gas generating agent.

When a collision of the subject vehicle 15 with the vulnerable road user is predicted and determined, the A-pillar airbag device 51 inflates and expands the A-pillar airbag 55 in accordance with a collision state such as that in which the head of the vulnerable road user is coming closer against an A-pillar not illustrated. This reduces an impact on the head of the vulnerable road user collided with the subject vehicle 15.

In the example illustrated in FIG. 2A, the subject vehicle 15 is equipped with two units of the A-pillar airbag devices 51, namely: a right A-pillar airbag device 51a disposed inside a right A-pillar (reference numeral not designated); and a left A-pillar airbag device 51b disposed inside a left A-pillar (reference numeral not designated). The A-pillar airbag device 51 includes the inflator 53 and the A-pillar airbag 55. The inflator 53 includes, for example: an ignitor not illustrated which is ignited upon receiving a signal instructing expansion of the A-pillar airbag 55; a gas generating agent such as sodium azide; and a housing for accommodating the ignitor and the gas generating agent.

Each of the hood popup device 35, the hood airbag device 37, and the A-pillar airbag device 51, each of which is included in the output system 19, may also be referred to as a protection device which works such that the vulnerable road user collided with the subject vehicle 15 is protected.

The collision prediction determination ECU (constituting a part of the collision prediction determination device 18) 13 includes, as illustrated in FIG. 1, an information acquisition part 61, a collision prediction determination part 63, and a control part 67.

The information acquisition part 61 acquires: the image information on an image taken by the camera 21 in the travelling direction of the subject vehicle 15; the surrounding area information, detected by the radar 23 and/or the lidar 25, on an object present in the first monitor area including an area ahead of the subject vehicle 15 in the travelling direction thereof; the proximity information, detected by the sonar 27 and/or the pressure tube sensor 29, on proximity including a contact thereof with an object present in the second monitor area in the proximity of the subject vehicle 15; the interspace information (the distances d1, d2; see FIG. 2B), detected by the sonar 27, on respective interspaces between the front bumper 7, and the bulkhead 47 and the bumper beam 49 (in-vehicle components); the G information detected by the G sensor 31; and the vehicle speed information detected by the vehicle speed sensor 33.

The collision prediction determination part 63 includes a storage part 65 configured to store therein various types of information. The storage part 65 stores therein information on template which defines various contour shapes and other appearance features of a "pedestrian" and a "cyclist". The template of the pedestrian is herein referred to as a "pedestrian template." The template of the cyclist is herein referred to as a "cyclist template". Those templates are used in analyzing whether or not the image information taken by the camera 21 contains an object.

The collision prediction determination part 63 predicts and determines a state of a collision of the subject vehicle 15 with a vulnerable road user including whether or not the collision has occurred, based on, as illustrated in FIG. 1: the image information on an image taken by the camera 21 in the travelling direction of the subject vehicle 15; the surrounding area information detected by the radar 23 and/or the lidar 25; the proximity information detected by the sonar 27 and/or the pressure tube sensor 29; the interspace information detected by the sonar 27 (an interspace sensor); the G (acceleration/deceleration) information detected by the G sensor 31; and the vehicle speed information detected by the vehicle speed sensor 33.

More specifically, the collision prediction determination part 63 has a relative distance and direction prediction determination function, an object prediction determination function, and a collision prediction determination function.

The relative distance and direction prediction determination function of the collision prediction determination part 63 predicts and determines a relative distance and a direction between the subject vehicle 15 and an object (including a vulnerable road user) present in an area ahead of the subject vehicle 15 in the traveling direction thereof. In predicting and determining the relative distance and the direction, the collision prediction determination part 63 may use, for example, information on a relative distance and a direction acquired based on the surrounding area information detected by the radar 23 and/or the lidar 25 (the surrounding area sensor), as it is as relative distance information and direction information. Or, the collision prediction determination part 63 may acquire the direction information by analyzing the image information acquired by the camera 21.

When an object is present in the first monitor area including the area ahead of the subject vehicle 15 in the traveling direction thereof, the object prediction determination function of the collision prediction determination part 63 predicts and determines a type of the object, based on the image information in the area ahead of the subject vehicle 15 in the traveling direction thereof, acquired by the camera 21. It is assumed in the present invention that the object is a vulnerable road user including a pedestrian and a cyclist.

What is actually done in predicting and determining whether or not a pedestrian and/or a cyclist is present is, however, that the collision prediction determination part 63: sequentially performs a contour extraction processing and a pattern matching processing to the image information ahead of the subject vehicle 15 in the traveling direction thereof; and extracts a pattern of the "pedestrian template" or the "cyclist template" stored in the storage part 65, from among objects contained in the image information.

The "object" used herein means a set of pixels each being contained in the image information and having a contour. For example, the collision prediction determination part 63 references the pedestrian template, based on which the collision prediction determination part 63 recognizes an object having a pedestrian-like contour in the pedestrian template, as a pedestrian. Also, the collision prediction determination part 63 references the cyclist template, based on which the collision prediction determination part 63 recognizes an object having a cyclist-like contour in the cyclist template, as a cyclist.

The collision prediction determination function of the collision prediction determination part 63 predicts and determines a collision state of the subject vehicle 15 with an object (including a collision situation of the object, a portion subjected to the predicted collision of the subject vehicle 15, a magnitude of force of the collision, and a degree of deformation of the subject vehicle 15).

When a predicted and determined result of a collision state of the subject vehicle 15 with a vulnerable road user matches a prescribed collision state (such as a pedal top dead point mode and a rear-end collision mode; to be described in detail hereinafter), the collision prediction determination part 63: downwardly revises a collision prediction determination threshold TH which is used in predicting and determining a collision state of the subject vehicle 15; and then predicts and determines the collision state of the subject vehicle 15 with the vulnerable road user, using the downwardly-revised collision prediction determination threshold TH. This will be described in detail hereinafter.

The collision prediction determination part 63 then determines whether or not the protection device 19 including the hood popup device 35, the hood airbag device 37, and the A-pillar airbag device 51 is to be operated, based on results of processings of the relative distance/direction prediction determination, the object prediction determination, and the collision state prediction determination.

The collision prediction determination ECU 13 is realized by a microcomputer including a CPU (Central Processing Unit), a ROM (Read Only Memory), a RAM (Random Access Memory), and the like. The microcomputer reads and executes a program or data stored in the ROM and operates to perform execution and control of a variety of functions of the collision prediction determination device 18, such as: various information acquisition functions; the collision prediction determination function, and operation control functions of the hood popup device 35, the hood airbag device 37, and the A-pillar airbag device 51.

<Collision States and Sensor Outputs>

Next are described a plurality of collision states predicted and determined by the collision prediction determination part 63 with reference to FIG. 3.

FIG. 3 is a diagram illustrating a plurality of the collision states predicted and determined by the collision prediction determination part 63.

In this specification, a collision state of the subject vehicle 15 collided with an object (a vulnerable road user) may also be referred to as a "collision scene".

A first collision scene SC1 illustrated in FIG. 3 assumes a case in which the subject vehicle 15 collides with a cyclist 90 crossing a road, just from a side of the cyclist 90. The cyclist 90 herein means a combination of a bicycle rider 70 and a bicycle 80 on which the bicycle rider 70 rides. A pedal 82 of the bicycle 80 nearer to the subject vehicle 15 is positioned at or near a top dead point thereof. The terms "at or near a top dead point" herein means a prescribed range (for example, ±45°) within which the pedal 82 rotates with respect to the top dead point.

A second collision scene SC2 assumes a case in which the subject vehicle 15 collides with another cyclist 92 crossing a road, just from a side of the cyclist 92. The cyclist 92 herein also means a combination of the bicycle rider 70 and the bicycle 80 on which the bicycle rider 70 rides. In the second collision scene SC2, the pedal 82 of the bicycle 80 nearer to the subject vehicle 15 is positioned at or near a bottom dead point thereof. The terms "at or near a bottom dead point" herein means a prescribed range (for example, ±45°) within which the pedal 82 rotates with respect to the bottom dead point.

In each of the first and second collision scenes SC1, SC2, a wheel 84 of the bicycle 80 is assumed to have a rim with a diameter of 26 inches. Further, a third collision scene SC3 assumes a case in which the subject vehicle 15 has collided (rear-ended) with a cyclist 94 (a child) having been traveling straight, from a backside of the cyclist 94. The cyclist 94 herein means a combination of the bicycle rider 70 and a bicycle 85 on which the bicycle rider 70 rides.

It is assumed in the example illustrated in the third collision scene CS3 that the bicycle 85 is for children and has a rim of a wheel 88 with a diameter of 18 inches (with a 18 inch frame) or smaller. It is also assumed that both the bicycle rider 70 who is a child and the bicycle 85 which is for children are light in weight. Note that, even when the bicycle rider 70 of the bicycle 85 is an adult, a sensor output is small in such a rear end collision.

Figure 4:
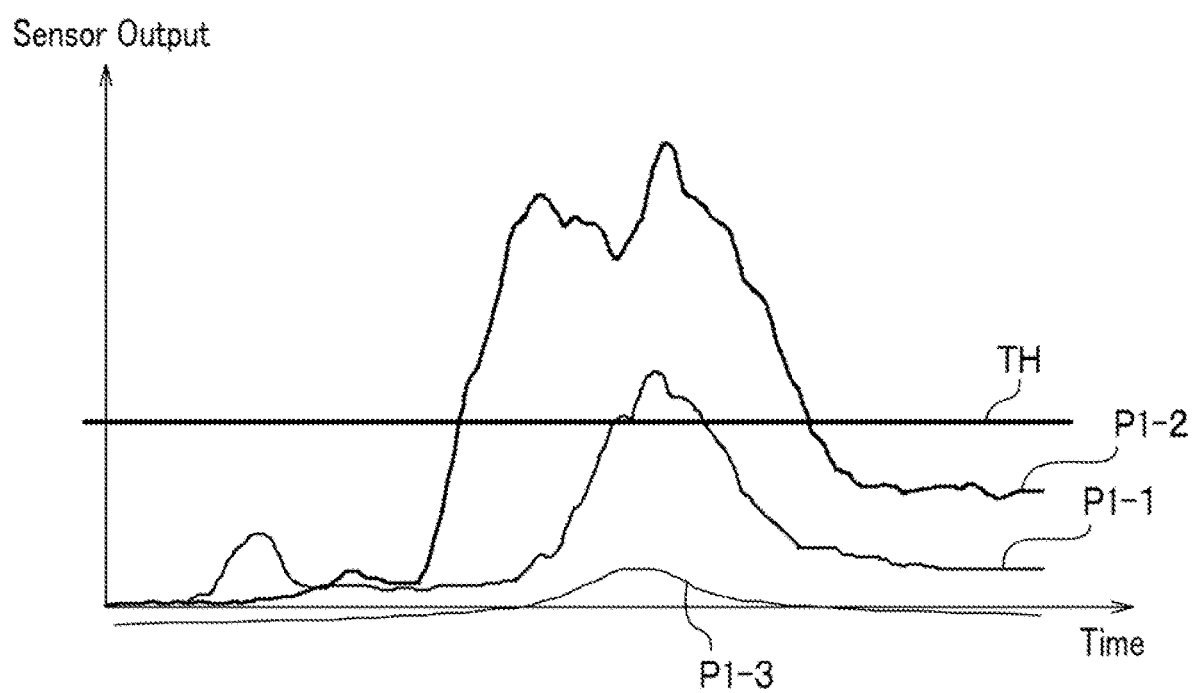
FIG. 4 is a graph illustrating an example of an output signal from a tube sensor according to the embodiment.

FIG. 4 is a graph illustrating an example of an output signal P1 from the first pressure tube sensor 29*a* (see FIG. 1). The output signal P1 herein collectively refers to an output signal from the first pressure tube sensor 29*a*.

In the second collision scene SC2 illustrated in FIG. 3, the output signal P1 demonstrates characteristics such as, for example, an output signal P1-2 illustrated in FIG. 4. It is demonstrated that the output signal P1-2 stays at a level exceeding a collision prediction determination threshold (which may also be simply referred to as a "threshold") TH illustrated in FIG. 4 for a considerably long period of time. Thus, when the output signal P1 exceeds the threshold TH, "collision occurrence" is herein predicted and determined.

In the second collision scene SC2, a collision can be detected based on the described above with high certainty. When "collision occurrence" is predicted and determined, the protection device 19 (see FIG. 1), namely, the hood popup device 35, the hood airbag device 37, and the A-pillar airbag device 51 are made to work, which makes it possible to protect the cyclist 92 as the collided object.

In the first collision scene SC1 illustrated in FIG. 3, the output signal P1 demonstrates characteristics such as, for example, an output signal P1-1 illustrated in FIG. 4. It is demonstrated therein that the output signal P1-1 stays at a level exceeding the threshold TH for a certain period of time. Depending on conditions, however, the output signal P1-1 may not exceed the threshold TH, and a collision of the subject vehicle 15 with the cyclist 90 may not be detected.

One of causes for possibly not exceeding the threshold is that, as illustrated in the first collision scene SC1 of FIG. 3, the pedal 82 is positioned near the top dead point (which is herein referred to as "pedal top dead point mode"). When the bicycle rider 70 is collided with the subject vehicle 15, with a leg thereof in a lifted-up position, the cyclist 90 can easily fall down with a relatively weak force. This results in a small plastic deformation of a face 7*a* (see FIG. 2B) of the front bumper 7.

In order to predict and determine a collision in the first collision scene SC1 with more certainty, let us assume that the threshold TH is reduced to a level lower than that illustrated in FIG. 4. Excessive reduction of the threshold TH may be, however, disadvantageous. This is because, in such cases, for example, that: "the subject vehicle 15 is hit with a stone"; "the subject vehicle 15 is hit with a road cone"; and "the subject vehicle 15 runs over a step", then a level of the output signal P1 may go up to that exceeding the threshold TH, which may make the protection device 19 perform unnecessary operations.

Thus, in this embodiment: in normal conditions, the threshold TH is set to a default value such as, for example, that illustrated in FIG. 4; and, when the first collision scene SC1 is predicted to occur, the threshold TH is temporarily lowered.

In the third collision scene SC3 illustrated in FIG. 3, the output signal P1 demonstrates characteristics such as, for example, an output signal P1-3 illustrated in FIG. 4. This is because, when the subject vehicle 15 collides with the bicycle 85 from behind (which may also be referred to as a "rear-end collision mode") as in the third collision scene SC3, the wheel 88 of the bicycle 85 plastically deforms the front bumper 7, the chin spoiler 8, or the like, while sliding underneath into the first pressure tube sensor 29a (see FIG. 1), which results in a considerably small rise in the output signal P1.

When the cyclist 94 is a child, the bicycle rider 70 and the bicycle 85 are light in weight, which also results in a small output. As described above, the bicycle 85 exemplified in the third collision scene SC3 of FIG. 3 is a small-diameter bicycle with the rim diameter of 18 inches or less.

Even when a bicycle collided by the subject vehicle 15 from behind is not for children but for adults, for example, a bicycle with the rim diameter of 26 inches or the like, the output signal P1 of the first pressure tube sensor 29a demonstrates waveform characteristics similar to those of the output signal P1-3. This is because even such a bicycle with the rim diameter of 26 inches has a hub (reference numeral not designated), a center of a wheel, of which height from the road surface is about 13 inches (about 330 mm). This means that the height of the hub is situated lower than a mounting height h1 (see FIG. 1) of the first pressure tube sensor 29a.

Thus, in this embodiment, as illustrated in FIG. 2A, the second pressure tube sensor 29b is disposed under the first pressure tube sensor 29a. In the third collision scene SC3, even though the output signal P1 of the first pressure tube sensor 29a does not significantly rise, an output signal P2 from the second pressure tube sensor 29b will do so (not illustrated). Note that the output signal P2 herein collectively refers to an output signal from the second pressure tube sensor 29b.

This makes it possible to detect such a collision as that in the third collision scene SC3 with reliability.

Figure 5:
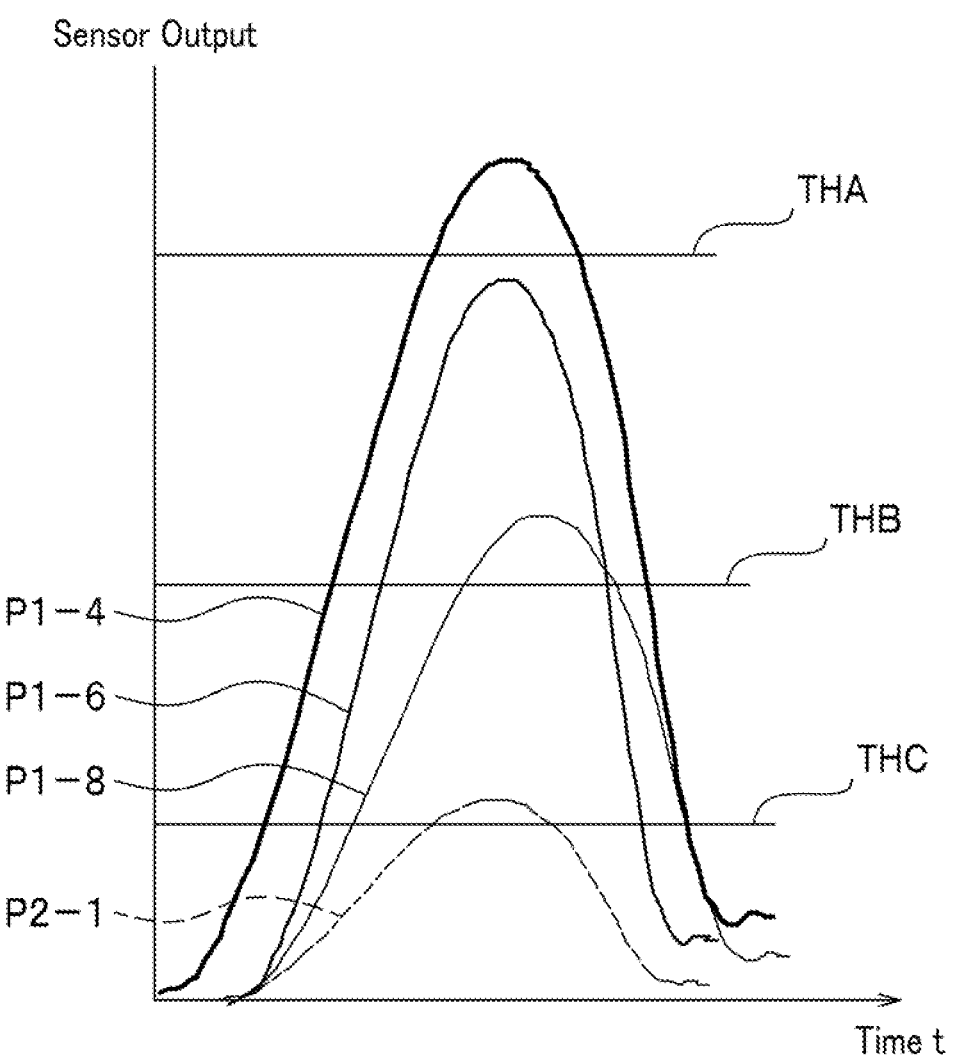
FIG. 5 is a graph for explaining a plurality of collision determination thresholds applied to the embodiment.

Next are described a plurality of collision prediction determination thresholds (or simply, thresholds) TH applied to the collision prediction determination device 18 with reference to FIG. 5 according to the embodiment of the present invention. Note that the threshold TH herein collectively refers to a collision prediction determination threshold applied to the collision prediction determination device 18.

FIG. 5 is a graph for explaining a plurality of collision determination thresholds applied to the collision prediction determination device 18 according to the embodiment of the present invention.

In FIG. 5, output signals P1-4, P1-6, and P1-8 each belong to the output signal P1 from the first pressure tube sensor 29a. An output signal P2-1 belongs to the output signal P2 from the second pressure tube sensor 29b.

A threshold THA is a reference value of the threshold TH (see FIG. 4). In ordinary cases, the threshold TH is set to the threshold THA. That is, the threshold THA is used when: an object is a vulnerable road user including a pedestrian and a cyclist; and the object is predicted and determined to be collided with the subject vehicle 15 with the collision state of the second collision scene SC2 (see FIG. 3). In this case, the output signal P1 from the first pressure tube sensor 29a varies as illustrated in the output signal P1-4, considerably exceeding the threshold THA.

The output signal P1-6 illustrated in FIG. 5 is an example of characteristics of the output signal P1 when the subject vehicle 15 has collided with a road cone (not illustrated). In the illustrated example of characteristics, the output signal P1-6 does not exceed the threshold THA. Thus, even when the subject vehicle 15 collides with the road cone, the protection device 19 (see FIG. 1) can avoid performing unnecessary operations. A threshold THB illustrated in FIG. 5 is a threshold TH temporarily used when the collision state of the first collision scene SC1 (see FIG. 3) is predicted and determined.

The output signal P1-8 illustrated in FIG. 5 is an example of the output signal P1 from the first pressure tube sensor 29a in the collision state of the first collision scene SC1. As illustrated in FIG. 5, the output signal P1-8 considerably exceeds the threshold THB, meaning that occurrence of the collision state of the first collision scene SC1 can be detected with high accuracy.

A threshold THC illustrated in FIG. 5 is the threshold TH which is temporarily applied to, when the collision state third collision scene SC3 (see FIG. 3) is predicted and determined to occur. The collision state output signal P2-1 is an example of the collision state output signal P2 from the collision state second pressure tube sensor 29b in the collision state third collision scene SC3.

As illustrated in FIG. 2B, the second pressure tube sensor 29b is disposed under the first pressure tube sensor 29a. Thus, even in the collision state of the third collision scene SC3, the output signal P2-1 significantly rises and exceeds the threshold THC.

This makes it possible to detect occurrence of the collision state of the third collision scene SC3 with high accuracy.

<Operations of Collision Prediction Determination Device 18>

Figure 6:
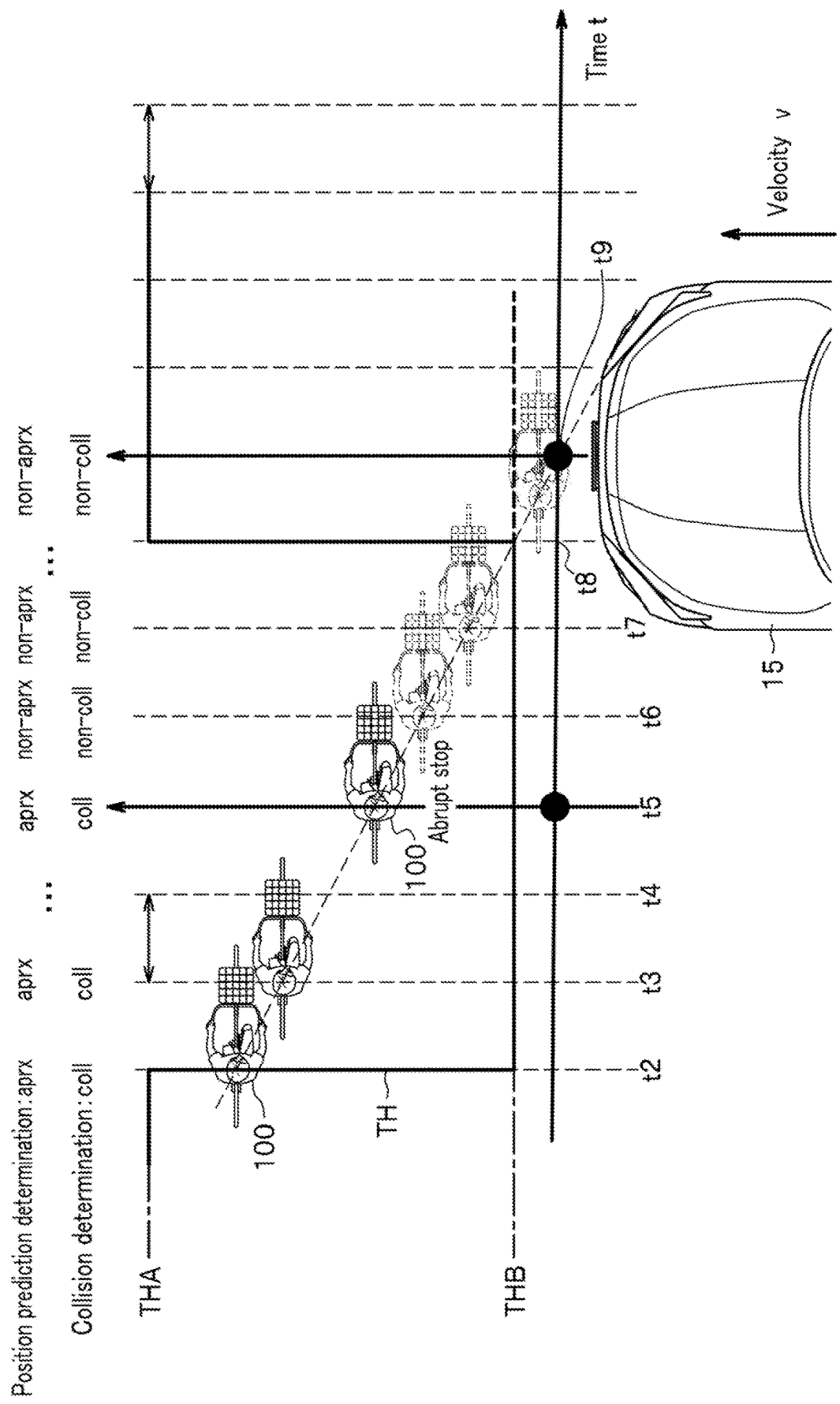
FIG. 6 is a schematic diagram illustrating operations of the collision prediction determination device according to the embodiment.

Next are described operations of the collision prediction determination device 18 with reference to FIG. 6 according to the embodiment of the present invention. FIG. 6 is a schematic diagram illustrating operations of the collision prediction determination device 18 according to the embodiment of the present invention.

FIG. 6 has a time on an abscissa thereof and a relative distance between object 100 and the subject vehicle 15 on an ordinate thereof. The ordinate also denotes a level of the threshold TH. In the example illustrated in FIG. 6, the subject vehicle 15 is traveling at a velocity v, and the travel object 100 is traveling in a direction orthogonal to the traveling direction of the subject vehicle 15.

Let us assume herein that, at a time t2, the collision prediction determination part 63 (see FIG. 1) of the subject vehicle 15 has recognized (has predicted and determined) a collision state of the subject vehicle 15 with the object 100. For example, the collision prediction determination part 63 has recognized that: the object 100 is a cyclist; the pedal 82 is positioned near the top dead point as illustrated in the first collision scene SC1 of FIG. 3; and the object 100 is about to be collided with the subject vehicle 15 at a (future) time t9.

Data on contents recognized by the collision prediction determination part 63 is updated at intervals of prescribed control cycles (for example, 100 ms (milliseconds)). Times t3 to t9 in FIG. 6 are timings at which one to seven control cycles have elapsed starting from the time t2, respectively. The collision prediction determination part 63 also predicts, at the time t2, a position of the object 100 at each of the incoming times t3 to t9. The position predicted as described above may also be referred to as a "predicted position". The term "position prediction determination" in FIG. 6 shows whether or not the predicted position is approximate to a measured result of an actual position of the object 100.

The term "approximate" (which may also be abbreviated to "aprx") herein means that a difference between the predicted position and the measured result of the actual position of the object 100 is within a prescribed allowable deviation. The term "non-approximate" (which may also be abbreviated to "non-aprx") herein means that the difference takes a value not within the prescribed allowable deviation. The term "collision determination" in FIG. 6 shows whether or not a collision of the subject vehicle 15 with the object 100 is predicted. The term "collision" (which may also be abbreviated to "coil") in FIG. 6 shows that, even when a brake operation or a steering operation of the subject vehicle 15 is performed, a collision is predicted to be unavoidable. The term "non-collision" (which may also be abbreviated to "non-coil") shows: that no collision is predicted; or that a brake or a steering operation is predicted to make a collision avoidable.

Let us assume herein that the object 100 is traveling at a constant speed during a time period from the time t2 to the time t5. At each of the times t3, t4, and t5, "position prediction and determination" is "approximate", and "collision determination" is "collision". At the time t5, assume that the object 100 recognizes the subject vehicle 15 and makes an abrupt stop. As a result, at and after the time t6, "position prediction and determination" is switched to "non-approximate", and "collision determination" is switched to "collision".

As described above, when a state in which "collision determination" is "non-collision" for a prescribed control time TA, the collision prediction determination part 63 changes the threshold TH back to the threshold THA as the reference value. In the illustrated example, the control time TA is 200 ms. That is, "collision determination" has been "non-collision" during the control time TA from the time t6 to the time t8, and the threshold TH is therefore returned to the threshold THA at the time t8.

Thus, even when a road cone (not illustrated) or the like is collided with the subject vehicle 15 after the time t8, the protection device 19 (see FIG. 1) can avoid performing unnecessary operations.

In the illustrated example described above, the control time TA is assumed to be 200 ms. The control time TA may take, however, any other value, as long as the value is within a range from, for example, 100 ms to 10 seconds. For example, the collision prediction determination part 63 may set a value of the control time TA, based on at least one of: a type of the collision state (the first to third collision scenes SC1 to SC3); a travel speed of the object 100; a TTC (Time-To-Collision); a dispersion degree of data (a position and a travel speed) on the object 100; and idle times in information communications and information processings.

<Camera/Radar (Including Lidar) Determination Processing>

Figure 7:
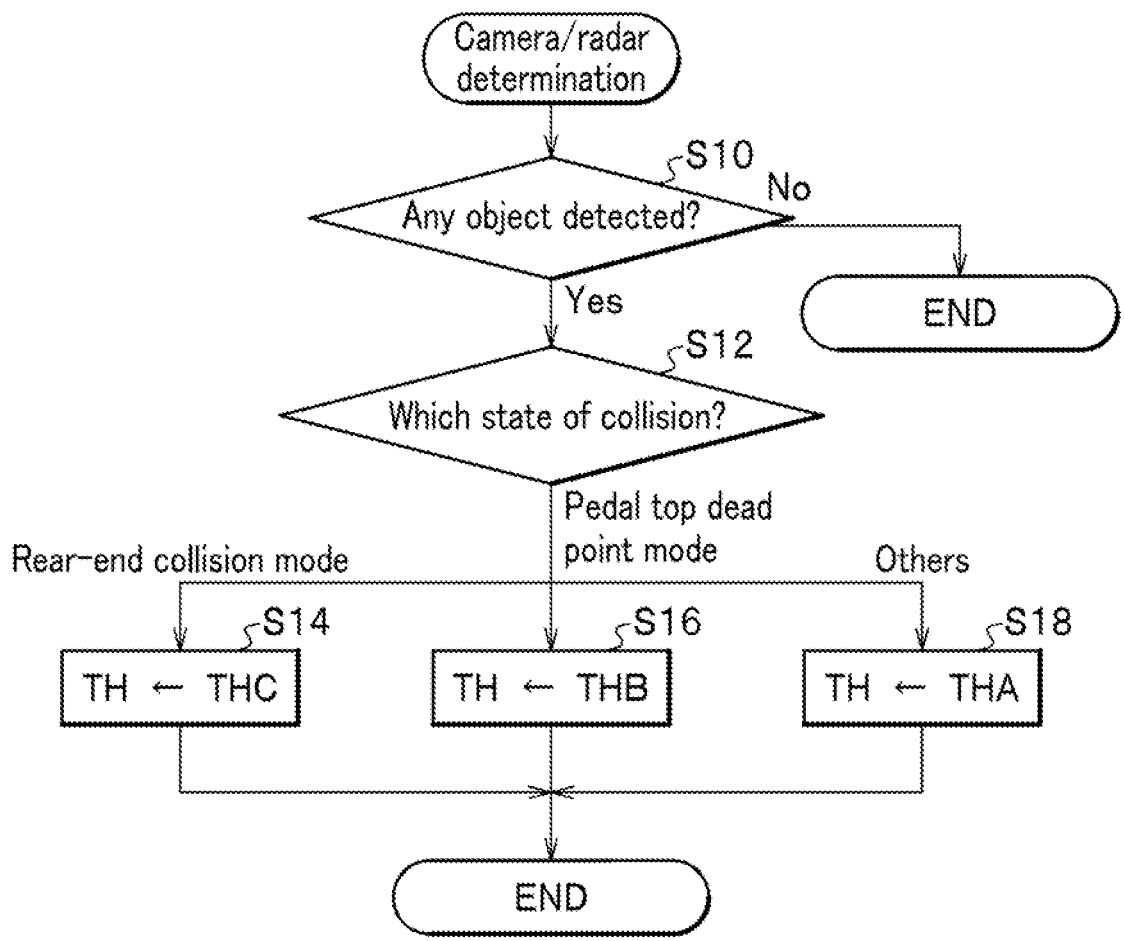
FIG. 7 is a flowchart of a camera/radar determination processing according to the embodiment.

Next is described a camera/radar determination processing performed by the collision prediction determination ECU 13 (see FIG. 1) with reference to FIG. 7. FIG. 7 is a flowchart of a camera/radar determination processing performed by the collision prediction determination ECU 13. The processing is activated on the above-described control cycle (for example, 100 ms).

In FIG. 7, when the processing advances to step S10, the collision prediction determination part 63 determines whether or not any object has been detected. In step S10, if "No" is determined, the processing terminates. In step S10, if "Yes" is determined, the processing advances to step S12.

In step S12, the processing is branched, depending on "predicted collision state of object" detected by the collision prediction determination part 63. When the rear-end collision mode (for example, the third collision scene SC3 illustrated in FIG. 3) to a cyclist is predicted and determined, the processing advances to step S14, the threshold TH is set to a threshold THC, and the processing.

After the processing terminates, the collision prediction determination part 63 makes the protection device 19 (see FIG. 1) operate, when either of the output signals P1, P2 (see FIG. 1) of the first and the second pressure tube sensors 29a, 29b, respectively, exceeds the threshold THC.

In step S12, if the collision state of the first collision scene SC1 (the pedal top dead point mode) illustrated in FIG. 3 is predicted and determined, the processing advances to step S16, the threshold TH is set to the threshold THB, and the processing terminates.

After the processing terminates, the control part 67 of the collision prediction determination ECU 13 makes the protection device 19 (see FIG. 1) operate, when either of the output signals P1, P2 (see FIG. 1) of the first and the second pressure tube sensors 29a, 29b, respectively, exceeds the threshold THB.

In step S12, if a collision state other than the first and the third collision scenes SC1, SC3 is predicted and determined, such as, for example, when the collision state of the second collision scene SC2 is predicted and determined or when the object is predicted and determined to be a pedestrian, then the processing advances to step S18. In step S18, the threshold TH is set to the threshold THA as the reference value, and the processing terminates.

After the processing terminates, the control part 67 of the collision prediction determination ECU 13 makes the protection device 19 (see FIG. 1) operate, when either of the output signals P1, P2 (see FIG. 1) of the first and the second pressure tube sensors 29a, 29b, respectively, exceeds the threshold THA.

<Sonar Response Processing>

Figure 8:
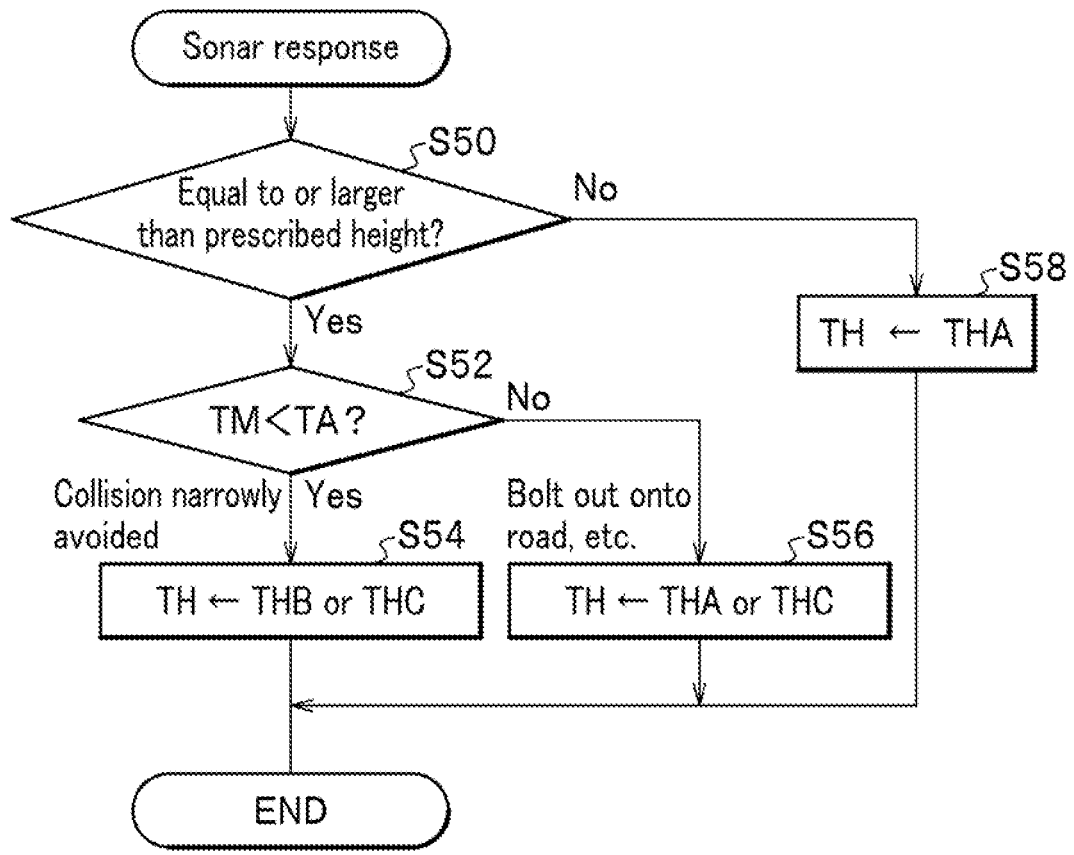
FIG. 8 is a flowchart of a sonar response processing according to the embodiment.

Next is described a sonar response processing performed by the collision prediction determination ECU 13 (see FIG. 1), with reference to FIG. 8. FIG. 8 is a flowchart illustrating the sonar response processing performed by the collision prediction determination ECU 13. The processing is activated when "collision determination" performed by the collision prediction determination part 63 is "non-collision", and, at the same time, when the sonar 27 makes a certain response. More specifically, the processing is activated: when "collision determination" performed by the collision prediction determination part 63 is "non-collision"; when an object is present ahead of the subject vehicle 15 in the traveling direction thereof; and when the sonar 27 detects the object.

In FIG. 8, when the processing advances to step S50, it is determined whether or not the detected object has a height equal to or larger than a prescribed height. The term "a prescribed height" herein means a height of a body of an ordinary dog or cat, which is, for example, "30 cm" to "50 cm". In step S50, if "No" is determined, the processing advances to step S58; the threshold TH is initialized to the threshold THA as the reference value; and the processing terminates.

After the processing terminates, the control part 67 of the collision prediction determination ECU 13 makes the protection device 19 (see FIG. 1) operate, when either of the output signals P1, P2 (see FIG. 1) of the first and the second pressure tube sensors 29a, 29b, respectively, exceeds the threshold THA.

In step S50, if "Yes" is determined, the processing advances to step S52; and whether or not a timer value TM is smaller than the control time TA is determined. The "timer value TM" used herein means a value: which is reset at the latest switch from "collision" to "non-collision" of "collision determination" (see FIG. 6); and which is thereafter counted up every prescribed time (for example, every 1 ms). That is, in the example illustrated in FIG. 6, the timer value TM indicates a time elapsed from the time t6.

In step S52, if "Yes" is determined, the processing advances to step S54, which means that a collision has been narrowly avoided before it actually occurs. More specifically, after "collision determination" (see FIG. 6) performed by the collision prediction determination part 63 becomes "collision", "collision determination" is switched to "non-collision" before the control time TA elapses. This corresponds to situations from the time t6 to t8 in FIG. 6. Even in the situations between the time t6 to t8 in FIG. 6, there is still a possibility that the object 100 bolts out ahead of the subject vehicle 15. In this case, if the sonar 27 detects any object, step S54 is performed.

In step S54, the threshold THB or THC is set as the threshold TH. That is, if the threshold TH used immediately before step S54 is performed is the threshold THB or THC, the same threshold TH is continued to be used. If the immediately-preceding threshold TH is the threshold THA, then the threshold THA is changed to threshold THB in step S54, and the processing terminates.

After the processing terminates, the control part 67 of the collision prediction determination ECU 13 makes the protection device 19 (see FIG. 1) operate, when either of the output signals P1, P2 (see FIG. 1) of the first and the second pressure tube sensors 29a, 29b, respectively, exceeds the threshold THB or THC.

In step S52 of FIG. 8, if "No" is determined, the processing advances to step S56. This means that, for example, a bolt of an object onto a road or the like has occurred. The term "bolt" used herein means that, for example, an object bolts out ahead of the subject vehicle 15 from a blind spot. When the object is a cyclist, there may be such a case in which: the cyclist is traveling in front of the subject vehicle 15 at a speed similar to that of the subject vehicle 15; and, if and when the cyclist hits a brake hard, the sonar 27 makes a certain response before "collision determination" performed by the collision prediction determination part 63 is switched to "collision".

In step S56, the threshold THA is set as the threshold TH. If a "prescribed condition" is satisfied, the threshold TH is changed to the threshold THC. The "prescribed condition" herein means that "the output signal P1 from the first pressure tube sensor 29a is equal to or smaller than the threshold THC, and the output signal P2 from the second pressure tube sensor 29b is larger than the threshold THC". After completion of step S56, the processing terminates.

Then, when the "prescribed condition" is satisfied, the control part 67 of the collision prediction determination ECU 13 makes the protection device 19 operate at that time. Meanwhile, if the "prescribed condition" is not satisfied, the control part 67 of the collision prediction determination ECU 13 makes the protection device 19 operate, when either of the output signals P1, P2 exceeds the threshold THA.

<Advantageous Effects of Collision Prediction Determination Device 18 and Vulnerable Road User Protection System 11 According to Embodiment of the Present Invention>

Next are described advantageous effects of the collision prediction determination device 18 and the vulnerable road user protection system 11 according to the embodiment of the present invention.

In a first aspect of the present invention, the collision prediction determination device 18 includes: the surrounding area sensor (the camera 21/radar 23/lidar 25) configured to acquire the surrounding area information which is information on an object present in the first monitor area including an area ahead of the the subject vehicle 15 in the traveling direction thereof; the proximity sensor (the sonar 27/pressure tube sensor 29) configured to acquire the proximity information on proximity of the subject vehicle 15 including information on a contact thereof with an object present in the second monitor area which is an area in the proximity of the subject vehicle 15; the interspace sensor (the sonar 27) configured to acquire the interspace information (the distances d1, d2; see FIG. 2B) which is information on respective interspaces between the in-vehicle component (the bulkhead 47/bumper beam 49) and the bumper member (the front bumper 7) disposed on the subject vehicle 15; and the collision prediction determination part 63 configured to predict and determine a state of a collision of the subject vehicle 15 collided with a vulnerable road user, including whether or not the collision has occurred, based on the surrounding area information acquired by the surrounding area sensor, the interspace information acquired by the interspace sensor, and the proximity information acquired by the proximity sensor.

In the collision prediction determination device 18 according to the first aspect, the collision prediction determination part 63 is configured to predict and determine a state of a collision of the subject vehicle 15 collided with a vulnerable road user, including whether or not the collision has occurred, based on the surrounding area information acquired by the surrounding area sensor, the interspace information acquired by the interspace sensor, and the proximity information acquired by the proximity sensor. Thus, the surrounding area information, the interspace information, and the proximity information, each of which is referenced when the collision state of the vehicle 15 collided with the vulnerable road user including a pedestrian and a cyclist is predicted and determined, can mutually complement necessary information for the prediction and the determination. This makes it possible to more suitably predict and determine the collision state of the vehicle 15 with the vulnerable road user.

In a second aspect of the present invention, in the collision prediction determination device 18 according to the first aspect, when a predicted and determined result of a collision state of the vehicle 15 with a vulnerable road user matches a prescribed collision state in which a sensor output tends to be smaller than a normal value even when a collision is highly likely to occur, then the collision prediction determination part 63 is configured to: downwardly revise the collision prediction determination threshold TH which is used in predicting and determining the collision state of the subject vehicle 15; and predict and determine the collision state of the subject vehicle 15 with the vulnerable road user, using the downwardly-revised collision prediction determination threshold TH.

In the collision prediction determination device 18 according to the second aspect, when the collision state is detected in which a sensor output tends to be smaller than a normal value even when a collision is highly likely to occur, the collision prediction determination part 63 is configured to: downwardly revise the collision prediction determination threshold TH which is used in predicting and determining a collision of the subject vehicle 15; and predict and determine the collision state of the subject vehicle 15 with the vulnerable road user, using the downwardly-revised collision prediction determination threshold TH. This makes it possible to more suitably predict and determine the collision state of the vehicle 15 with the vulnerable road user, when the collision state is detected in which a sensor output tends to be smaller than a normal value even when a collision is highly likely to occur.

In a third aspect of the present invention, in the collision prediction determination device 18 according to the second aspect, let us assume a case in which: once the collision prediction determination part 63 has predicted and determined a collision of the subject vehicle 15 with a vulnerable road user; and the surrounding area information is then acquired showing that the object is out of the first monitor area. After that, when the proximity information is acquired showing a high probability of another collision of the subject vehicle 15 with a vulnerable road user, the collision prediction determination part 63 predicts and determines a collision state of the vehicle 15 with the vulnerable road user, while keeping the downwardly-revised collision prediction determination threshold TH.

In the collision prediction determination device 18 according to the third aspect, in the case in which: once an occurrence of a collision of the subject vehicle 15 with a vulnerable road user has been predicted and determined; and the collision prediction determination threshold TH has been downwardly revised, then, if the surrounding area information is acquired showing that the object has been out of the first monitor area, such problems occur that whether or not the downwardly-revised collision prediction determination threshold TH is to be maintained, and, if so, how long.

In the collision prediction determination device 18 according to the third aspect, when the proximity information is acquired showing a high probability of an occurrence of another collision of the subject vehicle 15 with a vulnerable road user, then the collision prediction determination part 63 predicts and determines a collision state of the vehicle 15 collided with the vulnerable road user, while keeping the downwardly-revised collision prediction determination threshold TH.

In the collision prediction determination device 18 according to the third aspect, in the case described above, when the proximity information is acquired showing a high probability of another collision of the subject vehicle 15 with a vulnerable road user, a collision state of the subject vehicle 15 with the vulnerable road user is predicted and determined, while keeping the downwardly-revised collision prediction determination threshold TH. Thus, even when, for example, the subject vehicle 15 has narrowly avoided a collision with the object, the collision prediction determination device 18 keeps on alert on another collision, based on a probability used when the collision has been avoided. This makes it possible to further enhance a reliability on a result of prediction and determination on a collision state of the subject vehicle 15 with a vulnerable road user.

In a fourth aspect of the present invention, in the collision prediction determination device 18 according to any one of the first to third aspects, the collision prediction determination part 63 is configured to predict and determine, in addition to the collision state of the subject vehicle 15 with the vulnerable road user, whether or not an object bolts out ahead of the traveling direction of the subject vehicle 15, based on the interspace information acquired by the interspace sensor (the sonar 27) and the proximity information acquired by the proximity sensor (the sonar 27/pressure tube sensor 29).

In the collision prediction determination device 18 according to the fourth aspect, the collision prediction determination part 63 is configured to predict and determine, in addition to the collision state of the subject vehicle 15 with the vulnerable road user, whether or not any object bolts out ahead of the traveling direction of the subject vehicle 15, based on the interspace information acquired by the interspace sensor (the sonar 27) and the proximity information acquired by the proximity sensor (the sonar 27/pressure tube sensor 29). This makes it possible to, even when any object bolts out, predict and determine the bolt of the object timely and accurately.

In a fifth aspect of the present invention, in the collision prediction determination device 18 according to the fourth aspect, the proximity sensor is the pressure tube sensor 29 disposed in a vicinity of the front bumper 7 and extending in the vehicle width direction.

In the collision prediction determination device 18 in the fifth aspect, the proximity sensor is the pressure tube sensor 29 disposed in a vicinity of the front bumper 7 and extending in the vehicle width direction. The proximity sensor may include a sensor of two different types having detection mechanisms different from each other, namely, for example, the sonar 27 and the pressure tube sensor 29. Thus, even when a collision has a collision state of the rear-end collision mode in which: the subject vehicle 15 collides with a bicycle; and only a part of the face 7a (see FIG. 2B) of the front bumper 7 is plastically deformed, the collision of the subject vehicle 15 with the vulnerable road user can be predicted and determined timely and accurately.

In a sixth aspect of the present invention, in the collision prediction determination device 18 according to the third aspect, the collision prediction determination part 63 is configured to: set a value of the control time TA which is a time period during which the downwardly-revised collision prediction determination threshold TH is kept, based on at least one of the TTC (Time-To-Collision) and the idle times in information communications and information processings; and predict and determine the collision state of the subject vehicle 15 with the vulnerable road user, while keeping the downwardly-revised collision prediction determination threshold TH, from when the collision prediction determination threshold TH is downwardly revised until when the set control time TA elapses.

In the collision prediction determination device 18 according to the sixth aspect, the value of the control time TA used in keeping the downwardly-revised collision prediction determination threshold TH is configured to be set based on at least one of the TTC (Time-To-Collision) and the idle times in information communications and information processings. Thus, the control time TA can be set to a value having an appropriate length of time, taking actual conditions into account. This makes it possible to further suitably predict and determine the collision state of the vehicle 15 with the vulnerable road user.

In a seventh aspect of the present invention, in the collision prediction determination device 18 according to the sixth aspect, after the collision prediction determination threshold TH is downwardly revised and the set control time TA elapses, the collision prediction determination part 63 configured to: change the downwardly-revised value of the collision prediction determination threshold TH back to an original value thereof, and then predict and determine the collision state of the subject vehicle 15 with the vulnerable road user, using the original value.

In the collision prediction determination device 18 according to the seventh aspect, after the collision prediction determination threshold TH is downwardly revised and the set control time TA elapses, the collision prediction determination part 63 is configured to: change the downwardly-revised value of the collision prediction determination threshold TH back to an original value thereof; and then predict and determine the collision state of the subject vehicle 15 with the vulnerable road user, using the original value. Thus, the collision prediction determination threshold TH can be managed timely and accurately. This makes it possible to further suitably predict and determine the collision state of the vehicle 15 with the vulnerable road user.

In an eighth aspect of the present invention, the vulnerable road user protection system 11 is configured to protect a vulnerable road user collided with the subject vehicle 15. The vulnerable road user protection system 11 includes: the collision prediction determination device 18 according to any one of the first to the seventh aspects; the protection device (the hood popup device 35, the hood airbag device 37, and the A-pillar airbag device 51) 19 configured to operate such that the vulnerable road user collided with the subject vehicle 15 is protected; and the control part 67 configured to make the protection device 19 operate such that the vulnerable road user is protected, when the collision prediction determination part 63 predicts and determines a collision of the subject vehicle 15 with the vulnerable road user.

In the vulnerable road user protection system 11 according to the eighth aspect, the control part 67 makes the protection device 19 operate such that the vulnerable road user as the object is protected, when the collision prediction determination part 63 predicts and determines a collision of the subject vehicle 15 with the vulnerable road user. This makes it possible to, when the collision of the subject vehicle 15 with the vulnerable road user has occurred, protect the vulnerable road user from an impact of the collision timely and accurately.

OTHER EMBODIMENTS

The embodiments described above are provided as examples for embodying the present invention. Technical ideas of the present invention should not be therefore interpreted in a limited manner. The present invention can be realized in various embodiments within a scope not departing from the gist and major features of the present invention.

For example, the vulnerable road user protection system 11 has been described in the embodiment of the present invention by exemplifying the hood popup device 35 of four-point support type. The hood popup device 35 includes a pair of the right actuators 39a, 39b and a pair of the left actuators 41a, 41b disposed in each of the four corners (four points) of the substantially square-shaped bonnet hood 1, so as to extendably support the four corners of the bonnet hood 1 from below. The present invention is not, however, limited to the example.

Another structure of the hood popup device 35 can also be used, such as, for example, a hood popup device of three-point support type which includes three units of actuators disposed in three points in the substantially square-shaped bonnet hood 1, namely, one at a front center and two at rear corners, so as to extendably support the three corners of the bonnet hood 1 from below.

The collision prediction determination device 18 according to the embodiment of the present invention has been described by exemplifying the surrounding area sensor (the camera 21/radar 23/lidar 25), the proximity sensor (the sonar 27/pressure tube sensor 29), and the interspace sensor (the sonar 27), as the various sensors used when a state of a collision of the subject vehicle 15 with a vulnerable road user is predicted and determined, including whether or not the collision has occurred. The present invention is not, however, limited to the example.

It is to be understood that types, installed positions, the number of units, or the like of the various sensors described above can be set as appropriate according to necessity.

REFERENCE NUMERALS

- 5 front grille (bumper member)
- 7 front bumper (bumper member)
- 11 vulnerable road user protection system
- 15 vehicle, subject vehicle
- 18 collision prediction determination device
- 21 camera (surrounding area sensor)
- 23 radar (surrounding area sensor)
- 25 lidar (surrounding area sensor)
- 27 sonar (proximity sensor, interspace sensor)
- 29 pressure tube sensor (proximity sensor)
- 35 hood popup device (protection device)
- 37 hood airbag device (protection device)
- 47 bulkhead (in-vehicle component)
- 49 bumper beam (in-vehicle component)
- 51 A-pillar airbag device (protection device)
- 63 collision prediction determination part
- 67 control part

The invention claimed is:

1. A collision prediction determination device of a subject vehicle, comprising:
    a camera, a radar, and a lidar as surrounding area sensors configured to acquire surrounding area information which is information on an object present in a first monitor area, the object including a vulnerable road user, the first monitor area including an area ahead of and on a lateral side of the subject vehicle in a traveling direction thereof;
    a pressure tube sensor as a contact sensor disposed in a vicinity of a front bumper and extending in a width direction of the subject vehicle, the contact sensor being configured to acquire contact information which is information on whether or not the object including the vulnerable road user has come into contact with the subject vehicle;
    a sonar as a proximity sensor and an interspace sensor, wherein by using reflected waves, the sonar as the proximity sensor is configured to acquire proximity information which is information on the object including the vulnerable road user present in a second monitor area, the second monitor area including an area proximate to the subject vehicle in the traveling direction thereof, and the sonar as the interspace sensor is configured to acquire interspace information which is information on an interspace between a bumper member disposed on the subject vehicle and an in-vehicle component thereof, the sonar being set to have a response speed higher than that of the radar and the lidar; and
    a collision prediction determination part configured to predict and determine a state of a collision of the subject vehicle with the object including the vulnerable road user, the state of the collision including whether or not the collision has actually occurred, based on the surrounding area information acquired by the surrounding area sensors, the contact information acquired by the contact sensor, and the interspace information acquired by the interspace sensor, wherein when, based on the surrounding area information in the first monitor area acquired by the surrounding area sensors, a predicted and determined result of a collision state of the subject vehicle with the vulnerable road user matches a prescribed collision state, the prescribed collision state being a collision state in which a smaller sensor output than that of another prescribed collision state, the collision prediction determination part is configured to: downwardly revise a collision prediction determination threshold which is a threshold used in predicting and determining the collision state of the subject vehicle; and predict and determine the collision state of the subject vehicle with the vulnerable road user, using the downwardly-revised collision prediction determination threshold, and when the collision prediction determination threshold is downwardly revised based on the surrounding area information, (i) when a prescribed control time elapses after the collision prediction determination threshold is downwardly revised, the collision prediction determination part changes the downwardly-revised value of the collision prediction determination threshold back to an original value of the threshold, and then continues to predict and determine the collision state of the subject vehicle with the vulnerable road user, and (ii) when the prescribed control time elapses after the collision prediction determination threshold is downwardly revised, if the collision prediction determination device acquires the proximity information from the sonar as the proximity sensor having the response speed higher than that of the radar and the lidar, still showing a high probability of the collision of the subject vehicle with the vulnerable road user, then the collision prediction determination part keeps the downwardly-revised collision prediction determination threshold unchanged and then continues to predict and determine a possible collision state of the subject vehicle to be collided with the vulnerable road user.

2. The collision prediction determination device according to claim 1, wherein the collision prediction determination part is configured to predict and determine, in addition to the collision state of the subject vehicle with the vulnerable road user, whether or not an object bolts out ahead of the traveling direction of the subject vehicle, based on the interspace information acquired by the interspace sensor and the proximity information acquired by the proximity sensor.

3. A vulnerable road user protection system for protecting a vulnerable road user as an object collided with a subject vehicle, the vulnerable road user protection system comprising:

the collision prediction determination device according to claim 2;

a protection device configured to operate such that the vulnerable road user collided with the subject vehicle is protected; and a control part configured to make the protection device operate such that the vulnerable road user is protected, when the collision prediction determination part predicts and determines a collision of the subject vehicle with the vulnerable road user.

4. The collision prediction determination device according to claim 1, wherein the collision prediction determination part is configured to: set a value of the set control time which is a time period during which the downwardly-revised collision prediction determination threshold is kept, based on at least one of a time-to-collision and idle times in information communications and information processings; and predict and determine the collision state of the subject vehicle with the vulnerable road user, while keeping the downwardly-revised collision prediction determination threshold, from when the collision prediction determination threshold is downwardly revised until when the set control time elapses.

5. A vulnerable road user protection system for protecting a vulnerable road user as an object collided with a subject vehicle, the vulnerable road user protection system comprising:

the collision prediction determination device according to claim 4;

a protection device configured to operate such that the vulnerable road user collided with the subject vehicle is protected; and a control part configured to make the protection device operate such that the vulnerable road user is protected, when the collision prediction determination part predicts and determines a collision of the subject vehicle with the vulnerable road user.

6. A vulnerable road user protection system for protecting a vulnerable road user as an object collided with a subject vehicle, the vulnerable road user protection system comprising:

the collision prediction determination device according to claim 1;

a protection device configured to operate such that the vulnerable road user collided with the subject vehicle is protected; and a control part configured to make the protection device operate such that the vulnerable road user is protected, when the collision prediction determination part predicts and determines a collision of the subject vehicle with the vulnerable road user.

\* \* \* \* \*